Patented Apr. 9, 1946

2,398,331

UNITED STATES PATENT OFFICE 2,398,331

POLYHYDRIC PHENOL-ACETONE-FORMAL-DEHYDE PRODUCTS AND PROCESS OF MAKING SAME

John B. Rust, West Orange, and Frederick A. Hessel, Montclair, N. J., assignors to Montclair Research Corporation, a corporation of New Jersey No Drawing. Application March 18, 1944, Serial No. 527,140

7 Claims. (Cl. 260—54)

This invention relates to heat-hardenable, water-soluble phenolic-acetone-formaldehyde compositions and the process of making same.

It is an object of this invention to obtain compositions composed of permanently fusible acetone-formaldehyde condensation products and polyhydric phenols, said compositions being capable of being rendered insoluble and infusible. It is also an object to prepare compositions containing water-soluble acetone-formaldehyde condensation products and a water-soluble polyhydric phenol which are dissolved in water for use as coating compositions, adhesives, cements, paper and textile sizes, binders for molding compositions to produce molded articles, including pressed cork products, and the like. It is also an object to prepare mixtures of polyhydric phenols and an acetone-formaldehyde condensation product in stable, dry, powdered form and capable of dissolving in water to form heat-hardenable adhesives and binders.

Still further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

The preferred acetone-formaldehyde product which may be used according to the process of the present invention is obtained by refluxing one molecular equivalent of acetone and 6 molecular equivalents of formaldehyde in the presence of a substantial amount of a mild alkaline condensing agent, such as disodium phosphate, borax or the like or some substance whose aqueous solutions show a pH of about 9 to 10. The reaction mixture remains homogeneous and the reaction is easily controlled. After refluxing for some hours, the solution is dehydrated by heating under a vacuum. A hard, water-white, transparent resin, soluble in water, and which does not harden on continued heating at high temperatures either alone or in the presence of alkali, is obtained.

Acetone is the preferred ketone of the present invention, although higher water-soluble ketones may be used, such as methyl ethyl ketone, diethyl ketone and the like as well as diketones, triketones, etc. Aqueous formaldehyde solutions may be used as well as polymeric formaldehyde.

The polyhydric phenols of the present invention include resorcinol, orcinol, pyrogallol, tannic acid, vegetable tannins such as quebracho, sumac, and the like, resacetophenone, etc. Monohydric phenols do not produce heat-hardening compositions. The polyhydric phenols are mixed with the acetone-formaldehyde condensation product. According to one procedure, the polyhydric phenols are dissolved in the solutions of acetone-formaldehyde condensation products in the cold. These solutions are then added to fillers, are poured, brushed or dipped, or used as plywood adhesive, impregnant, textile size and the like. Application of heat, or an acid or basic catalyst alone or in combination with heat is necessary to effect a thorough cure, or hardening of the resins. Excellent plywoods have been produced as will hereinafter be described.

Another procedure comprises forming an intimate mixture of the solid polyhydric phenol and acetone-formaldehyde condensation product in dry powdered form. Such mixtures are stable on storage, are in convenient form for shipping and at the time of use are dissolved in water to form a solution which can be used as stated.

Curing or fixing may occur by heating at about 100° C., or more. A mild acid catalyst is preferred although neutral or basic conditions are used as well as salts which give an acid reaction on heating under curing conditions such as ammonium salts of strong acids.

The amount of polyhydric phenol is not especially critical although about 10% has been found to be satisfactory. Greater or less amounts than 10% may be employed to secure special effects.

The following examples are given to illustrate the process and products of the present invention. All proportions are in parts by weight.

*Example 1.*—An acetone-formaldehyde syrup was made as follows: 58 parts of acetone, 320 parts of 37% formaldehyde solution and 6 parts of borax were refluxed together for 6 hours, after which an additional 6 parts of borax were added and refluxing continued for 6 hours. The solution was divided into a number of portions as follows:

| | Parts |
|---|---|
| A. Acetone-formaldehyde solution | 40 |
| Resorcinol | 10 |
| Ammonium sulfate | 1 |

A clear solution was obtained. It was stable for several weeks, finally forming a stiff gel.

| | Parts |
|---|---|
| B. Acetone-formaldehyde solution | 40 |
| Resorcinol | 10 |

A clear, stable solution was obtained.

| C. | Parts |
|---|---|
| Acetone-formaldehyde solution | 39 |
| Pyrogallol | 10 |
| Ammonium sulfate | 1 |

A clear solution was obtained. This solution was stable for several hours.

| D. | Parts |
|---|---|
| Acetone-formaldehyde solution | 39 |
| Pyrogallol | 10 |

A clear solution was obtained which was stable for more than one week.

| E. | Parts |
|---|---|
| Acetone-formaldehyde solution | 30 |
| Tannic acid | 6 |
| Ammonium sulfate | 0.6 |

A clear solution was obtained which was stable for several days.

| F. | Parts |
|---|---|
| Acetone-formaldehyde solution | 10 |
| Orcinol | 1 |
| Ammonium sulfate | 0.2 |

A clear solution, stable for at least one week, was obtained.

| G. | Parts |
|---|---|
| Acetone-formaldehyde solution | 40 |
| Quebracho powder | 10 |
| Ammonium sulfate | 1 |

A clear, but dark red, solution was obtained which was stable for several days.

*Example 2.*—The solutions made up in Example 1 were used to laminate wood in making plywood. Three thin sections of wood were coated with the water solutions of Example 1 and dried at a low temperature. The pieces of wood were stacked with their grains crossed and pressure applied by means of screw clamps. The whole assembly was heated at 130° C. for 2 hours. In every case a firm bond resulted. On boiling in water with complete immersion of the sample, all of the plywoods withstood 1 hour of boiling without delaminating. The plywood formed from Solution A, Example 1, withstood 6 hours of boiling at complete immersion, followed by 16 hours in water at room temperature, without delaminating even with strong shearing force applied.

*Example 3.*—10 parts of wood flour were impregnated with 20 parts of solution A of Example 1. The wet composition was dried thoroughly and discs were molded from the composition at 3000 p. s. i. and 150° C. for 5 minutes. Well cured, brown, strong moldings were secured. On boiling these discs in water for 6 hours very little distortion was noted. In one case it was found that a disc had gained 8% in weight after this boiling water treatment.

*Example 4.*—The acetone-formaldehyde resin prepared according to the procedure of Example 1 was dehydrated by heating to 130° C. under a pressure of 20 mm. for 4 hours. A hard, brittle, water-soluble resin was secured. The resin was ground to a fine powder.

| A. | Parts |
|---|---|
| Powdered resin | 25 |
| Resorcinol | 5 |
| Ammonium chloride | 1.25 |

| B. | Parts |
|---|---|
| Powdered resin | 10 |
| Resorcinol | 10 |
| Ammonium chloride | 1 |

The two preparations were homogenized and stored at ordinary temperature. A very stable dry powder was the result. The powders were used as a plywood adhesive by dissolving in water to form a 50% solution and applying the solution to wood veneer. The veneers were dried, pressed together under light screw pressure and heated at 130° C. for 1 hour. A firm resin-bonded plywood was formed which would withstand boiling water.

We claim:

1. A heat-curable composition comprising a water-soluble polyhydric phenol having the hydroxyl groups attached to the same aryl nucleus, a water soluble hard acetone-formaldehyde resin formed by reacting 1 mole of acetone with 6 moles of formaldehyde in the presence of borax, and a curing catalyst therefor comprising an ammonium salt of a strong acid, the amount of polyhydric phenol being from about 10% to 100%, based on the acetone resin.

2. A heat-curable composition comprising resorcinol, a water-soluble hard acetone-formaldehyde resin formed by reacting 1 mole of acetone with 6 moles of formaldehyde in the presence of borax, and a curing catalyst therefor comprising an ammonium salt of a strong acid, the amount of resorcinol being from about 10% to 100% based on the acetone resin.

3. A heat-curable composition comprising resorcinol, a water-soluble hard acetone-formaldehyde resin formed by reacting 1 mole of acetone with 6 moles of formaldehyde in the presence of borax, and ammonium sulfate, the amount of resorcinol being from about 10% to 100% based on the acetone resin.

4. A dry powder composition capable of being dissolved in water to form a heat-hardenable adhesive comprising an intimate mixture of (1) a water-soluble polyhydric phenol having the hydroxyl groups attached to the same aryl nucleus, (2) the dehydrated water-soluble hard resinous reaction product of 1 mole of acetone with 6 moles of formaldehyde in the presence of borax, and (3) an ammonium salt of a strong acid, the amount of polyhydric phenol being from about 10% to 100%, based on the acetone resin.

5. A dry powder composition capable of being dissolved in water to form a heat-hardenable adhesive comprising an intimate mixture of (1) resorcinol, (2) the dehydrated water-soluble hard resinous reaction product of 1 mole of acetone with 6 moles of formaldehyde in the presence of borax, and (3) ammonium chloride, the amount of resorcinol being from about 10% to 100% based on the acetone resin.

6. The process of making a heat-hardened composition which comprises mixing together a water-soluble polyhydric phenol having the hydroxyl groups attached to the same aryl nucleus, a water-soluble hard resin obtained by reacting 1 mole of acetone with 6 moles of formaldehyde in the presence of borax, and a water-soluble curing catalyst which is acidic under heat-curing conditions, and heating at between about 100° to 150° C. until hardened, the amount of polyhydric phenol being from about 10% to 100% based on the acetone resin.

7. The heat-hardened composition of claim 1.

JOHN B. RUST.
FREDERICK A. HESSEL.